US010423132B2

(12) United States Patent
Finnerty et al.

(10) Patent No.: US 10,423,132 B2
(45) Date of Patent: Sep. 24, 2019

(54) GAMING APPROACH FOR ENERGY EFFICIENT BUILDING CONTROL

(71) Applicants: Shaun Finnerty, Chicago, IL (US); Michael Pawlowski, Barlett, IL (US); Jeffrey Hriljac, Port Barrington, IL (US)

(72) Inventors: Shaun Finnerty, Chicago, IL (US); Michael Pawlowski, Barlett, IL (US); Jeffrey Hriljac, Port Barrington, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 837 days.

(21) Appl. No.: 14/040,214

(22) Filed: Sep. 27, 2013

(65) Prior Publication Data

US 2015/0094857 A1    Apr. 2, 2015

(51) Int. Cl.
*G05B 15/02*    (2006.01)

(52) U.S. Cl.
CPC .... *G05B 15/02* (2013.01); *G05B 2219/25011* (2013.01)

(58) Field of Classification Search
CPC ................... G05B 13/02; G05B 15/02; G05B 2219/25011
USPC ......................................................... 700/275
See application file for complete search history.

(56) References Cited

U.S. PATENT DOCUMENTS

| | | | |
|---|---|---|---|
| 6,157,943 A | 12/2000 | Meyer | |
| 7,873,485 B2* | 1/2011 | Castelli | G01D 4/004 702/61 |
| 8,265,776 B2* | 9/2012 | Osann, Jr. | G06Q 50/06 340/637 |
| 2007/0055757 A1 | 3/2007 | Mairs et al. | |
| 2009/0281886 A1 | 11/2009 | Vittoriao et al. | |
| 2010/0324962 A1 | 12/2010 | Nesler et al. | |
| 2011/0046805 A1* | 2/2011 | Bedros | H04L 12/2809 700/291 |
| 2011/0132991 A1* | 6/2011 | Moody | G05D 23/1902 236/46 R |
| 2012/0011126 A1 | 1/2012 | Park et al. | |
| 2012/0109397 A1 | 5/2012 | Min et al. | |
| 2012/0296799 A1* | 11/2012 | Playfair | G06Q 10/00 705/37 |
| 2013/0024799 A1* | 1/2013 | Fadell | G05D 23/1902 715/771 |
| 2013/0035799 A1 | 2/2013 | Song et al. | |
| 2014/0018971 A1* | 1/2014 | Ellis | G06Q 10/04 700/297 |
| 2014/0058567 A1* | 2/2014 | Matsuoka | G05D 23/1917 700/276 |

FOREIGN PATENT DOCUMENTS

JP    2006079426 A    3/2006

OTHER PUBLICATIONS

PCT Search Report for Application No. PCT/US2014/052853, dated Dec. 8, 2014, 11 pages.
European Search Report dated May 18, 2017, for EP Patent Application No. 14849959.3, 7 pages.

* cited by examiner

*Primary Examiner* — Christopher E. Everett (57) ABSTRACT

An approach for changing behavior of users of a building automation system by employing gaming function logic and providing feedback to the building automation system users.

21 Claims, 6 Drawing Sheets

GAMING APPROACH FOR ENERGY EFFICIENT BUILDING CONTROL

FIELD OF THE INVENTION

This application relates generally to building automation systems, and more particularly, to use of gaming approaches in building automation systems to promote energy saving behavior of occupants.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

The elements of a building automation system may be widely dispersed throughout a facility or campus. For example, an HVAC system includes temperature sensors and ventilation damper controls as well as other elements that are located in virtually every area of a facility or campus. Similarly, a security system may have intrusion detection, motion sensors and alarm actuators dispersed throughout an entire building or campus. Likewise, fire safety systems include smoke alarms and pull stations dispersed throughout the facility or campus. The different areas of a building automation system may have different environmental settings based upon the use and personal likes of people in those areas, such as offices and conference rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc., Building Technologies Division, of Buffalo Grove, Ill. ("Siemens"), which may be used with the Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points". Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices.

Large commercial and industrial facilities have numerous field devices that are used for environmental control purposes. These field devices may be referred to herein as "environmental control devices".

As the environmental settings of the environmental control devices have traditionally been set using thermostats and switches, limited security was available to secure the devices. Known approaches have included covers with locks to prevent modification of a thermostat or lights. More recently, wired and wireless network approaches have been employed, where networked or smart switches and thermostats have been accessed and controlled by people to adjust the environment they are currently in, such as an office, conference room, hotel room, or dorm room via a computer, wireless device, and mounted control devices that communicate with the building data networks. Since the practice of allowing building occupants to interact directly with the building automation system to set their preferable environmental settings becomes an acceptable practice in the building control industry, it is highly desirable to promote energy efficient operation thinking and energy saving behavior to building occupants.

In view of the foregoing, there is an ongoing need for systems, apparatuses and methods for promoting desired user behavior and interaction with building automation systems.

SUMMARY

In view of the above, an approach is provided for promoting desired behavior when accessing and using building automation systems. Individual users and/or groups of users of the environmental control devices may have access for modifying points while being identifiable to the building automation system, and gaming approaches may be employed to change undesired actions or reward desired actions. Desired actions may include energy efficient operations, life or fire safety, and security activities, such as turning down a thermostat, turning off lights and other appliances, closing blinds, and arming a security system. Rewards may be given for meeting predetermined thresholds of activity or being the best performer to give but a few examples.

Other devices, apparatus, systems, methods, features and advantages of the invention will be or will become apparent to one with skill in the art upon examination of the following

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION

An example approach for modification of environmental settings is presented. In the example, a user may modify the environmental settings of a building automation system via generation of a machine readable code that is read by a reader device located in an environmental control access panel. Prior to the generation of the machine readable code, the device or application that generates the machine readable code is configured or populated with configuration and authentication data.

Figure 1:
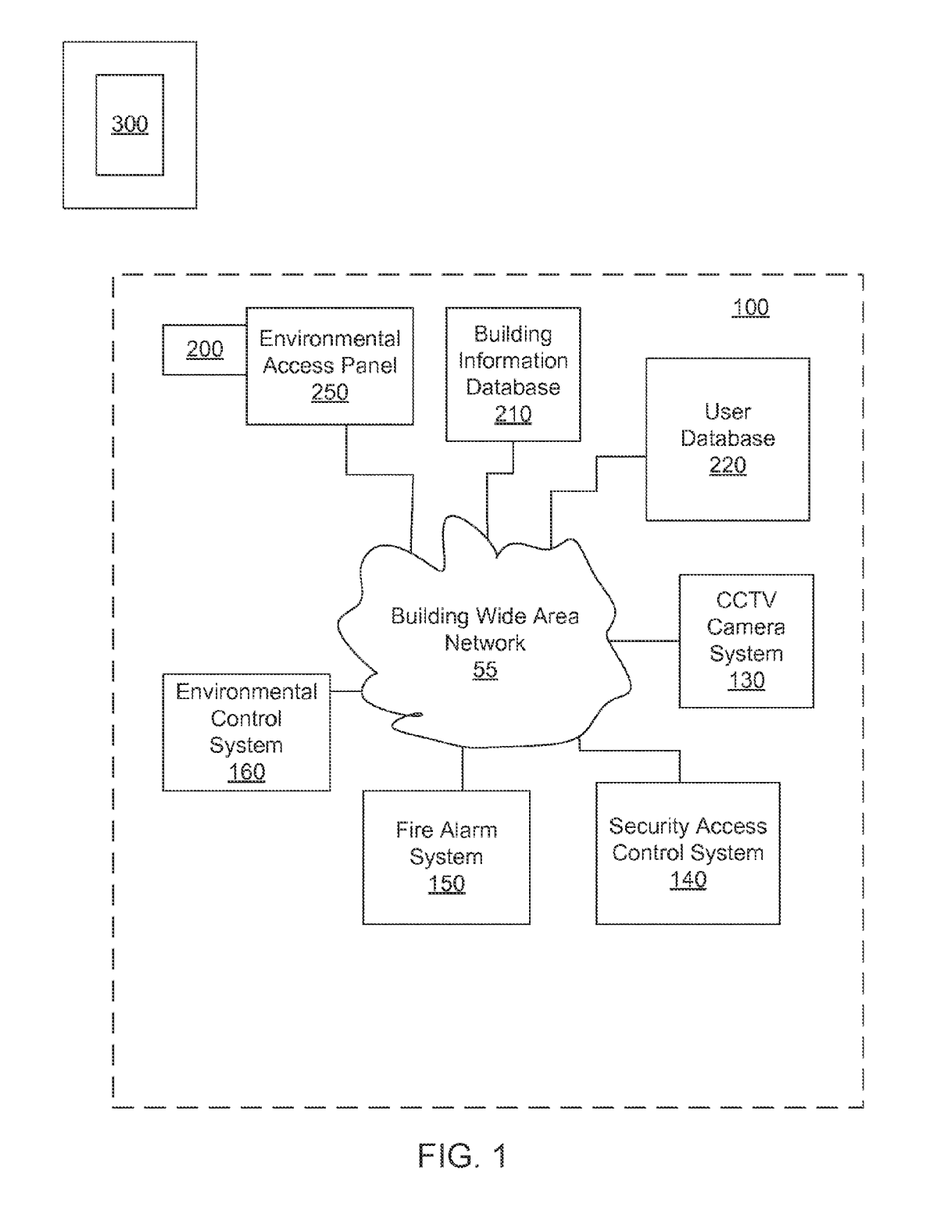
FIG. 1 shows an exemplary topology diagram for a building automation system having an environmental control access panel.

With reference to FIG. 1, an exemplary topology diagram for a building automation system approach is shown. The building wide area network 55 includes a plurality of systems and components in wired or wireless communication. The building wide area network 55 generally includes a plurality of building automation systems 100 and may be accessed via a "building synergistic interface system" or "BSIS". The BSIS 200 may be changed by one or more mobile computing devices 300 (sometimes referred to as smart devices) that are able communicate with the BSIS 200 that may be part of an environmental control access panel 250. Examples of smart devices or mobile computing devices 300 include smart cellular telephones, notebook computers, pad computers, eBook readers, and digital music players, such as iPods. The BSIS 200 further may include access to a data storage device comprising a building information database 210 and a user database 220. Software for communicating environmental and other data to the BSIS 200 may be stored on both the mobile computing device 300 and/or the building automation system 100. As will be explained herein, the BSIS 200 enables one or more of the environmental settings in a building automation system to be adjusted based on human actions without a network connection between the mobile computing device 300 and the BSIS 200.

In the following pages, the general arrangement of an exemplary building automation system 100 configured for use with the BSIS 200 is explained first. Thereafter, the general arrangement of the environmental control access panel 250 is explained followed by the general arrangement of the mobile computing device 300. Overall operation of the BSIS 200 is discussed following the description of the building automation system (BAS), environmental access control panel 250, and the mobile computing device 300.

Figure 2:
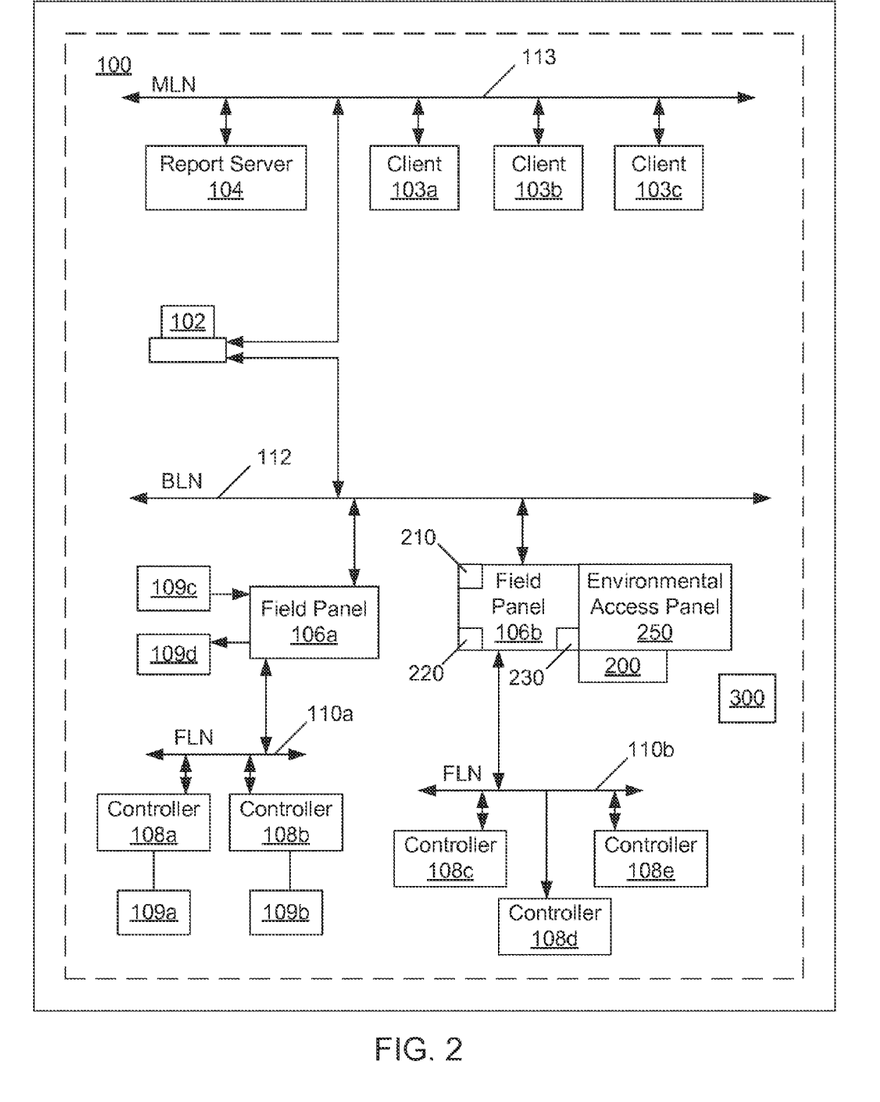
FIG. 2 shows an exemplary block diagram of a building automation system of the building network of FIG. 1.

In the example embodiment of FIG. 1, the building automation system 100 includes a building information database 210, user database 220, closed circuit television system 130, a security system 140, a fire alarm system 150, and an environmental control system 160. In FIG. 2, a system block diagram of an exemplary building automation system (BAS) 100 within a building or campus is depicted. The building automation system 100 is depicted as a distributed building system that provides control functions for any one of a plurality of building operations, such as environmental control, security, life or fire safety, industrial control and/or the like. An example of a BAS is the Apogee® building automation system available from Siemens Industry, Inc., Building Technologies Division, of Buffalo Grove, Ill. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

With particular reference to FIG. 2, the building automation system 100 includes at least one supervisory control system or workstation 102, client workstations 103a-103c, report server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of a plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystem, each controller 108a-108e connects to one or more field devices, such as sensors or actuators, shown by way of example in FIG. 2 as the sensor 109a is connected to the controller 108a and the actuator 109b is connected to controller 108b.

Typically, a controller such as the controller 108a affects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers 108a-108e, the field panels 106a and 106b, the work station 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the workstation 102 and the report server 104. The field panels 106a and 106b thereby coordinate the communication of data and control signals between the subsystems 108a-108e and the supervisory computer 102 and report server 104. In addition, one or more of the field panels 106a, 106b may themselves be in direct communication with and control field devices, such as ventilation damper controllers or the like. To this end, as shown in FIG. 2, the field panel 106a is coupled to one or more field devices, shown for example as a sensor 109c and an actuator 109d.

The workstation (server in other implementations) 102 provides overall control and monitoring of the building automation system 100 and includes a user interface. The workstation 102 further operates as a BAS data server that exchanges data with various elements of the BAS 100. The BAS data server can also exchange data with the report server 104. The BAS server 102 allows access to the BAS system data by various applications. Such applications may be executed on the workstation 102 or other supervisory computers (not shown).

With continued reference to FIG. 2, the workstation 102 is operative to accept modifications, changes, alterations and/or the like from the user. This is typically accomplished via a user interface of the workstation 102. The user interface may include a keyboard, touch screen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/ or the like from the user.

The workstation 102 also preferably maintains a database associated with each field panel 106a and 106b. The database maintains operational and configuration data for the associated field panel. The report server 104 stores historical data, trending data, error data, system configuration data, graphical data and other BAS system information as appropriate. In at least one embodiment, the building information database 210 and the user database 220 may be accessed by the BSIS 200 via the BAS server 102. In other embodiments the building information database 210 and the user database 220 may be stored elsewhere, such as workstation 102.

The management level network ("MLN") 113 may connect to other supervisory computers and/or servers, internet gateways, or other network gateways to other external devices, as well as to additional network managers (which in turn connect to more subsystems via additional low level data networks). The workstation 102 may operate as a supervisory computer that uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

FIG. 2 also shows that the BAS 100 may include a field panel 106b that is shown in FIG. 2 as a housing that holds the building information database 210, the user database 220, and the environmental access panel 250 having BSIS 200. The mobile computing device 300 is configured for wireless communications with the BAS 100 via the environmental access panel 250 provided on the field panel 106b. While the foregoing BSIS members are shown in FIG. 2 as being associated with one of the field panels 106b, it will be recognized that in other embodiments these and other BSIS members may be differently positioned in or connected to the BAS 100. For example, the building information database 210 and the user database 220 of the BSIS could be provided on the workstation 102. Alternatively, the building information database 210 and the user database 220 could be housed separately from those components shown in FIG. 2, such as in a separate computer device that is coupled to the building level network 112 or other BAS location. Such a separate computer device could also be used to store BSIS operational software. Similarly, the environmental access panel 250 with BSIS 200 may be housed within the workstation 102 or within a separate computer device coupled to the building level network 112 of the BAS.

Figure 3:
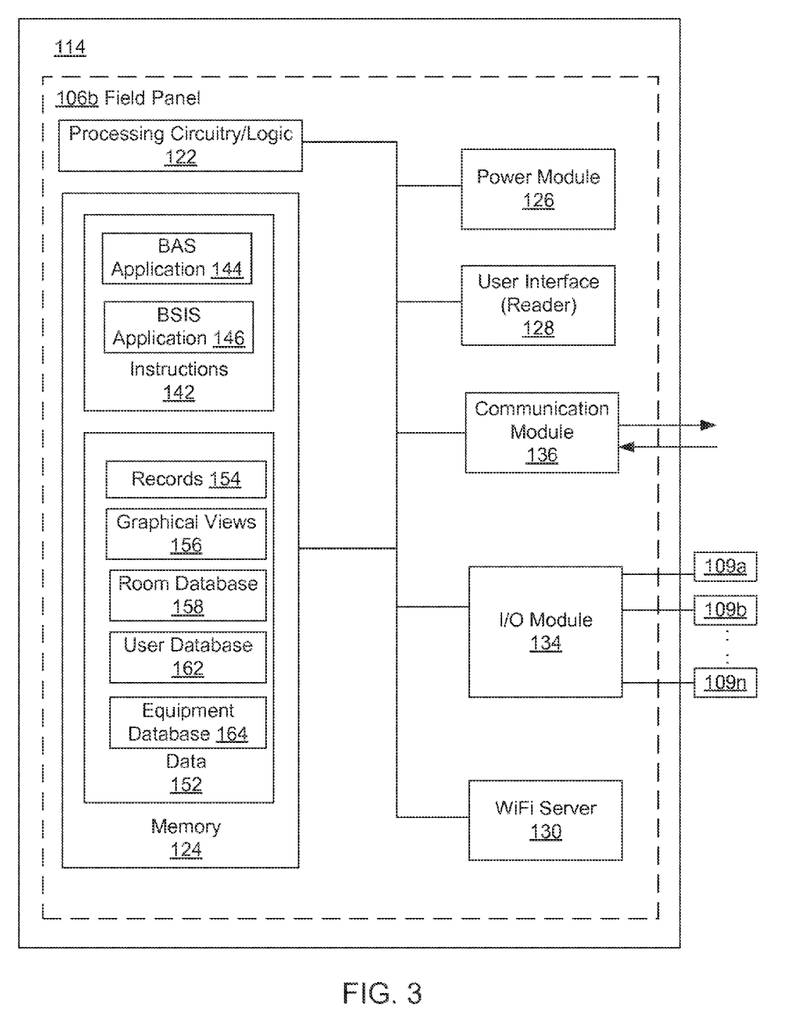
FIG. 3 shows an exemplary internal block diagram of a field panel for the building automation system of FIG. 2.

With reference now to FIG. 3, a block diagram of an exemplary embodiment of the field panel 106b of FIG. 2 is shown. It should be appreciated that the embodiment of the field panel 106b is only an exemplary embodiment of a field panel in a BAS 100 coupled to the BSIS 200. As such, the exemplary embodiment of the field panel 106b of FIG. 3 is a generic representation of all manners or configurations of field panels that are operative in the manner set forth herein.

The field panel 106b of FIG. 3 includes a cabinet or the like 114 that is configured in a typical manner for a building automation system field panel. The field panel 106b includes processing circuitry/logic 122, memory 124, a power module 126, a user interface 128, an I/O module 134, a BAS network communications module 136, and the Wi-Fi server 130.

The processing circuitry/logic 122 is operative, configured and/or adapted to operate the field panel 106b including the features, functionality, characteristics and/or the like as described herein. To this end, the processing circuitry logic 122 is operably connected to all of the elements of the field panel 106b described below. The processing circuitry/logic 122 is typically under the control of program instructions or programming software or firmware contained in the instructions 142 area of memory 124, explained in further detail below. In addition to storing the instructions 142, the memory also stores data 152 for use by the BAS 100 and/or the BSIS 200.

The field panel 106b also includes a power module 126 that is operative, adapted and/or configured to supply appropriate electricity to the field panel 106b (i.e., the various components of the field panel). The power module 126 may operate on standard 120 volt AC electricity, but may alternatively operate on other AC voltages or include DC power supplied by a battery or batteries.

An input/output (I/O) module 134 is also provided in the field panel 106b. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106b further includes a BAS network communication module 136. The network communication module 136 allows for communication to the controllers 108c and 108e as well as other components on the FLN 110b, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106b may be accessed locally. To facilitate local access, the field panel 106b includes an interactive user interface 128. Using user interface 128, the user may control the collection of data from devices such as sensor 109a and actuator 109b. The user interface 128 of the field panel 106b includes devices that display data and receive input data. Reception of input data may include a code reader device, such as a Quick Response (QR) code reader. These devices may be devices that are permanently affixed to the field panel 106b or portable and moveable. The user interface 128 may also suitably include an LCD type screen or the like, and a keypad. The user interface 128 is operative, configured and/or adapted to both alter and show information regarding the field panel 106b, such as status information, and/or other data pertaining to the operation, function and/or modifications or changes to the field panel 106b.

As mentioned above, the memory 124 includes various programs that may be executed by the processing circuitry/logic 122. In particular, the memory 124 of FIG. 3 includes a BAS application 144 and a BSIS building application 146. The BAS application 144 includes conventional applications configured to control the field panel 106b of the BAS 100 in order to control and monitor various field devices 109a-n of the BAS 100. Accordingly, execution of the BAS application 144 by the processing circuitry/logic 122 results in control signals being sent to the field devices 109a-n via the I/O module 134 of the field panel 106b. Execution of the BAS application 144 also results in the processor 122 receiving status signals and other data signals from various field devices 109a-n, and storage of associated data in the memory 124. In one embodiment, the BAS application 144 may be provided by the Apogee® Insight® BAS control software commercially available from Siemens Industry, Inc. or another BAS control software.

In addition to the instructions 142, the memory 124 may also include data 152. The data 152 includes records 154, graphical views 156, a room database 158, a user database 162, and an equipment database 164. The records 154 include current and historical data stored by the field panel 106b in association with control and operation of the field devices 109a-n. For example, the records 154 may include current and historical temperature information in a particular room of the building 99, as provided by a thermistor or other temperature sensor within the room. The records 154 in the memory may also include various set points and control data for the field devices 109, which may be pre-installed in memory 124 or provided by the user through the user interface 128. The records 154 may also include other information related to the control and operation of the 100 BAS and BSIS building application 146, including statistical, logging, licensing, and historical information.

The graphical views 156 provide various screen arrangements to be displayed to the user via the user interface 128. The user interface 128 may be displayed at thermostats with displays or other user access points having displays, such as liquid crystal displays, light emitting diode displays, or other known types of visual displays devices.

The room database 158 may include data related to the layout of the building 99. This room database 158 includes a unique identifier for each room or area within the building (e.g., room "12345"). In addition to the unique identifier data, the room database 158 may include other information about particular rooms or areas within the building 99. For example, the room database 158 may include information about field devices located within the room or area, particular equipment (e.g., research equipment, manufacturing equipment, or HVAC equipment) positioned within the room or area.

The user database 162 may include data related to human users who frequent the building 99. Accordingly, the user database 162 may include a unique identifier for each human user (e.g., user "12345") and a user profile associated with that user. In other implementations, each room or area may have a profile that has one or more users associated with it. The user profile may include information provided by the user or provided by third parties about the user. For example, the user profile may include a preferred temperature or lighting level for the user, which is provided to the user database 162 by the user. Also, the user profile may include a security clearance level, room access, or data access for the user, all provided to the database 162 by a third party, such as the human resources department or security department for the employer who owns the building 99.

The equipment database 164 may include data related to various pieces of equipment within the building 99. The equipment may include field devices associated with the BAS 100 or other equipment that is positioned within the building 99. For example, the equipment database 164 may include information related to manufacturing or research equipment located in a particular room of the building. The equipment database 164 maintains a unique identifier for each piece of equipment (e.g., equipment "12345") and data associated with that equipment. For example, the database 164 may associate particular schematics, operation manuals, photographs, or similar data with a given piece of equipment within the database 164.

While the field panel 106b has been explained in the foregoing embodiment as housing the BSIS building application 146 and various BSIS databases, such as the room database 158, user database 162, and equipment database 164, it will be recognized that these components may be retained in other locations in association with the BAS 100. For example, these components could all be retained within the central workstation 102 of the BAS 100 or a separately designated BSIS computing device in the BAS 100.

Figure 4:
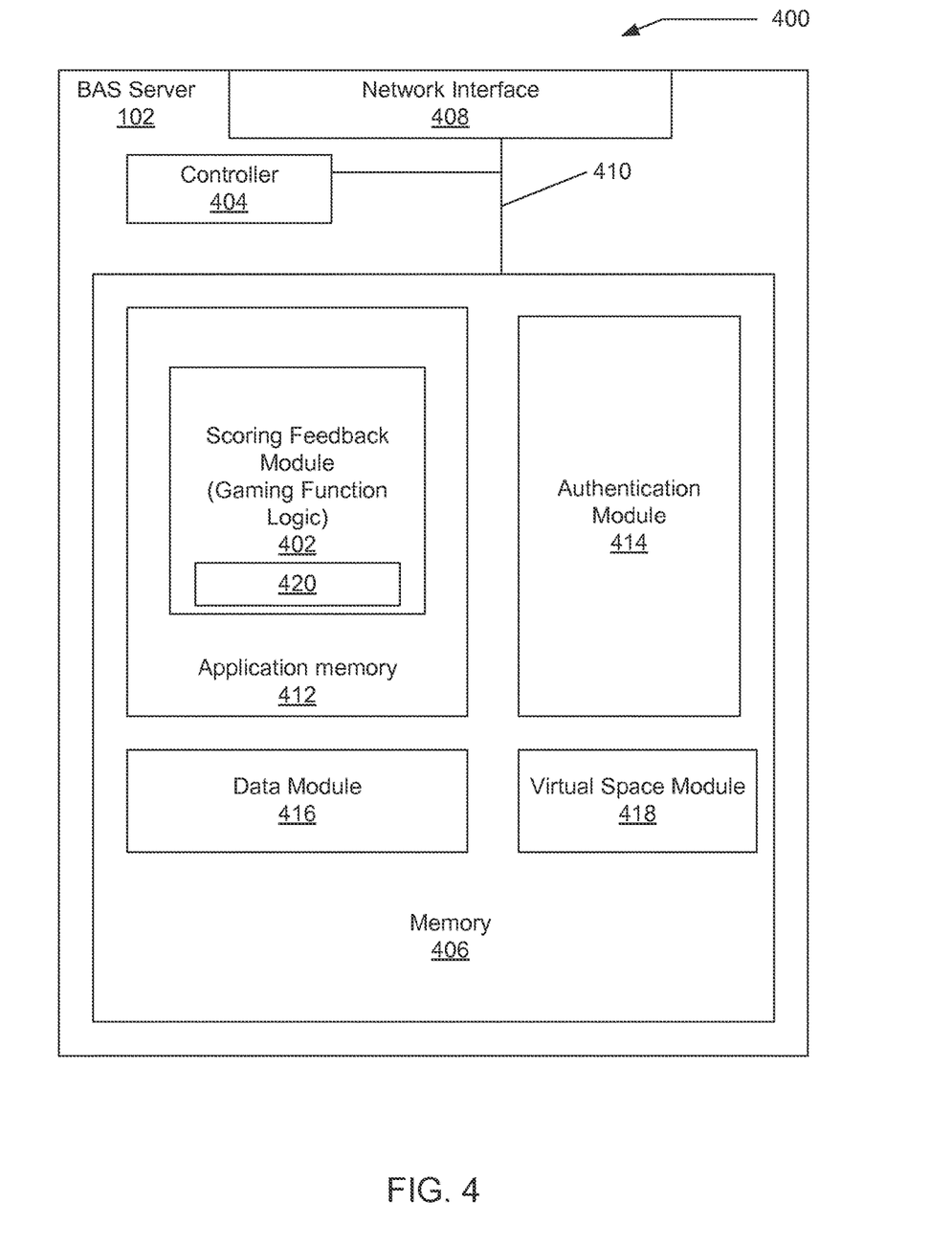
FIG. 4 shows an exemplary block diagram of BAS server 102 of FIG. 2 with a scoring feedback module.

Turing to FIG. 4, an exemplary block diagram 400 of BAS server 102 of FIG. 2 with a scoring feedback module 402 is illustrated. The BAS server 102 has a controller 404 that executes machine readable instructions stored in memory or accessed via the network. Examples of a controller 404 may include a microprocessor having one or more cores, microcontroller, application specific integrated circuit (ASIC), digital signal processor, digital logic devices configured to execute as a state machine, analog circuits configured to execute as a state machine, or a combination of the above. The controller 404 is typically electronically coupled to memory 406, network interface 408 and other parts of the server via one or more buses (represented as bus 410). The memory 406 may be random access memory, SDRAM, DIMM, or other types of digital storage capable of read/write access. The network interface 408 is an Ethernet network connection in the current implementation. In other implementations, additional or other types of data network interfaces may be employed.

Within the memory 406, there may be areas for applications 412, authentication module 414, data module 416, and virtual space module 418. One of the applications or modules that may be stored and executed from the application memory 412 is a scoring feedback module 402. Another term for the scoring feedback module 402 is gaming function logic. In addition to the scoring feedback module 402, other BAS applications (not shown in FIG. 4) may be stored and executed in the application memory 412.

The authentication module 414 may contain user identification information, such as login, permission, expiration time, email address, location information. A person accessing a BAS 100 with an external device, such as a computer, smart phone, or other personal computing device to change an environmental parameter may require the person to log into the BAS 100. The authentication and user information for accessing the BAS 100 may reside in the authentication module 414. In other implementations, the authentication module 414 may be distributed among multiple servers and databases, implemented on a standalone server, or combined with other modules.

The virtual space module 418 may contain a database or data structure that maps or groups points in the BAS 100 into groups that may represent physical rooms, such as a dorm room, conference room, or similar location. Virtual locations may also be defined, such as a grouping of cubicles in an office and a grouping of rooms. The virtual space module 418 may be accessed by the authentication module 414 and an association created between users and groups of points (i.e virtual spaces). The association is stored in the current example in the authentication module 414. In other implementations the associations may be stored in the scoring feedback module 402, data module 416, the virtual space module 418, or on a different server. In yet other implementations, geofencing techniques may be used to define virtual spaces, Geofencing uses the global positioning functionality of a smart device's global position system (GPS) or radio frequency identification (RFID) to verify if the smart device is located within predefined geographical boundaries, such as a virtual room or area.

The data module 416 is an area of memory for storing data and variables used by applications in the application memory. The data module 416 may also contain data used by the hardware of the BAS server 102.

The scoring feedback module 402 in application memory 412, when executed by the controller 404 enables user behavior to be modified through positive reinforcement, negative reinforcement, or a combination of positive and negative reinforcement. The scoring feedback module 402 is also capable of storing multiple gaming rules for scoring the game, evaluating user behavior, and reinforcing the behavior. Further, the scoring feedback module 402, may also have a plurality of rules 420 for defining one or more "games". The rules are implemented as a group of database calls executed by the controller that process the BAS data and user inputs (which may be entered and transmitted to the BAS 100 or Field Panel 106a, 106b via user mobile or smart device 300) in order to "score" the "game." In other implementations, hard coded predefined rules may be employed.

Figure 5:
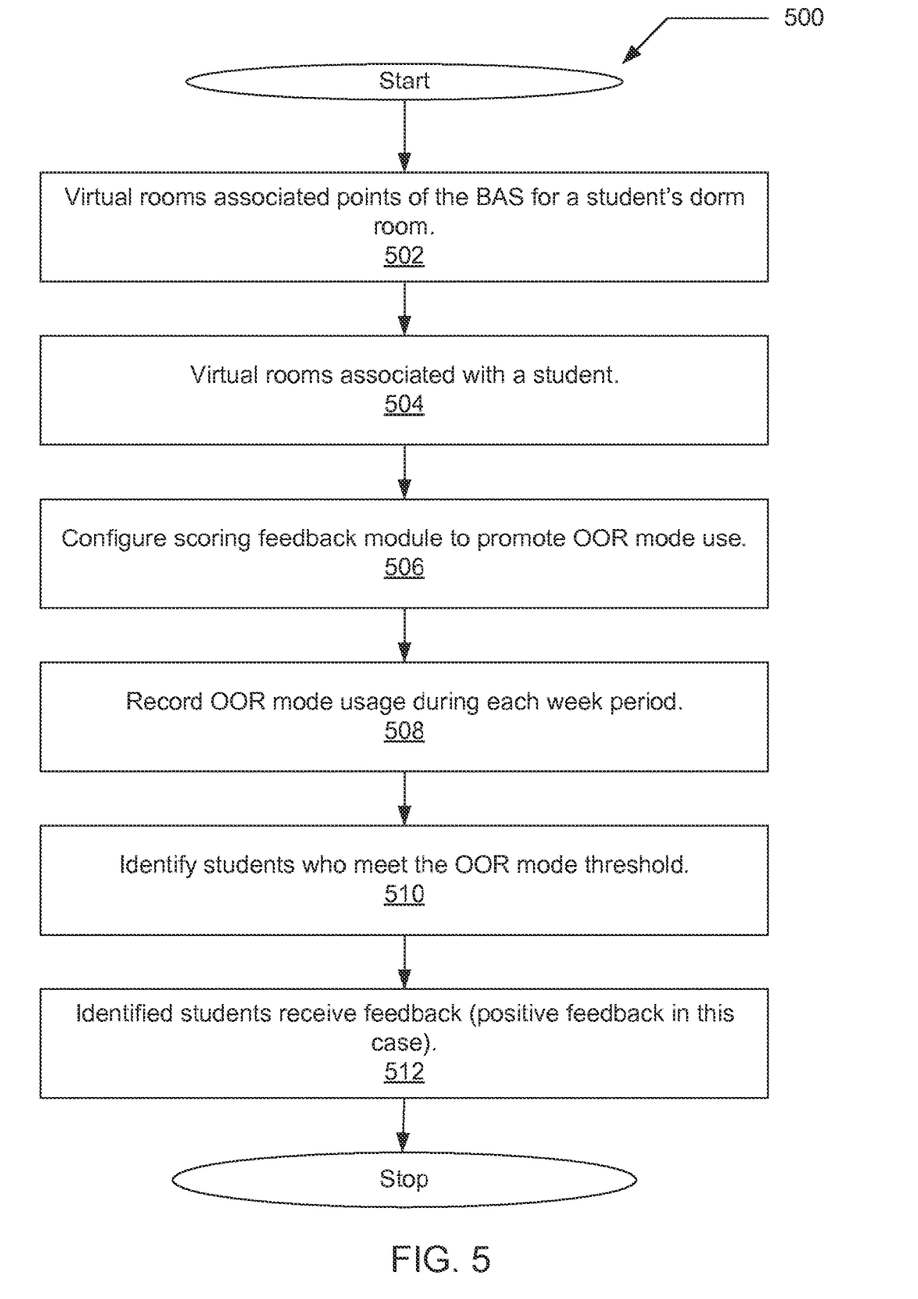
FIG. 5 illustrates a flow diagram of a gaming approach implemented by the scoring feedback module in the BAS server 102 of FIG. 4.

In FIG. 5, a flow diagram 500 of a "game" implemented in the scoring feedback module 402 is illustrated. In the example of FIG. 5, the behavior of dorm students is rewarded for placing their networked thermostat in an "out of room" ("OOR") mode in order to reduce the cooling or heating energy while the room is empty resulting in energy savings. The virtual room is defined for each dorm room where the points for that area (dorm room) are grouped together 502. The virtual room is then associated with the student or user via the authentication module 414 in step 504. The scoring feedback module is then configured to promote the use of the OOR mode use in step 506. The scoring feedback module 402 in the current example is configured via a graphical interface accessed via the internet to record when a thermostat's OOR mode is entered. The scoring feedback module 402 records the time when the OOR mode was entered and then when it was exited in step 508. A threshold of the number of hours of the OOR mode operation is checked for each day. At the end of a week, if the OOR mode has met the threshold each day, the student who is associated with the virtual room (his doom room in this case) in step 510 receives positive feedback in step 512. The positive feedback may be an email sent to the student with a coupon for a free soda. In other implementations, other types of feedback may be employed, such as a reduction in the student's utility bill (BAS 100 communicates with student housing invoicing server). Although only the OOR mode is described in the current implementation, there can be other "game" modes that can be implemented by the scoring feedback module (402). Such other "game modes" may include: frequency of participation in modifying the environmental control set points to reduce heating and cooling energy; cumulative energy operating cost savings achieved by groups of gamers, etc.

Figure 6:
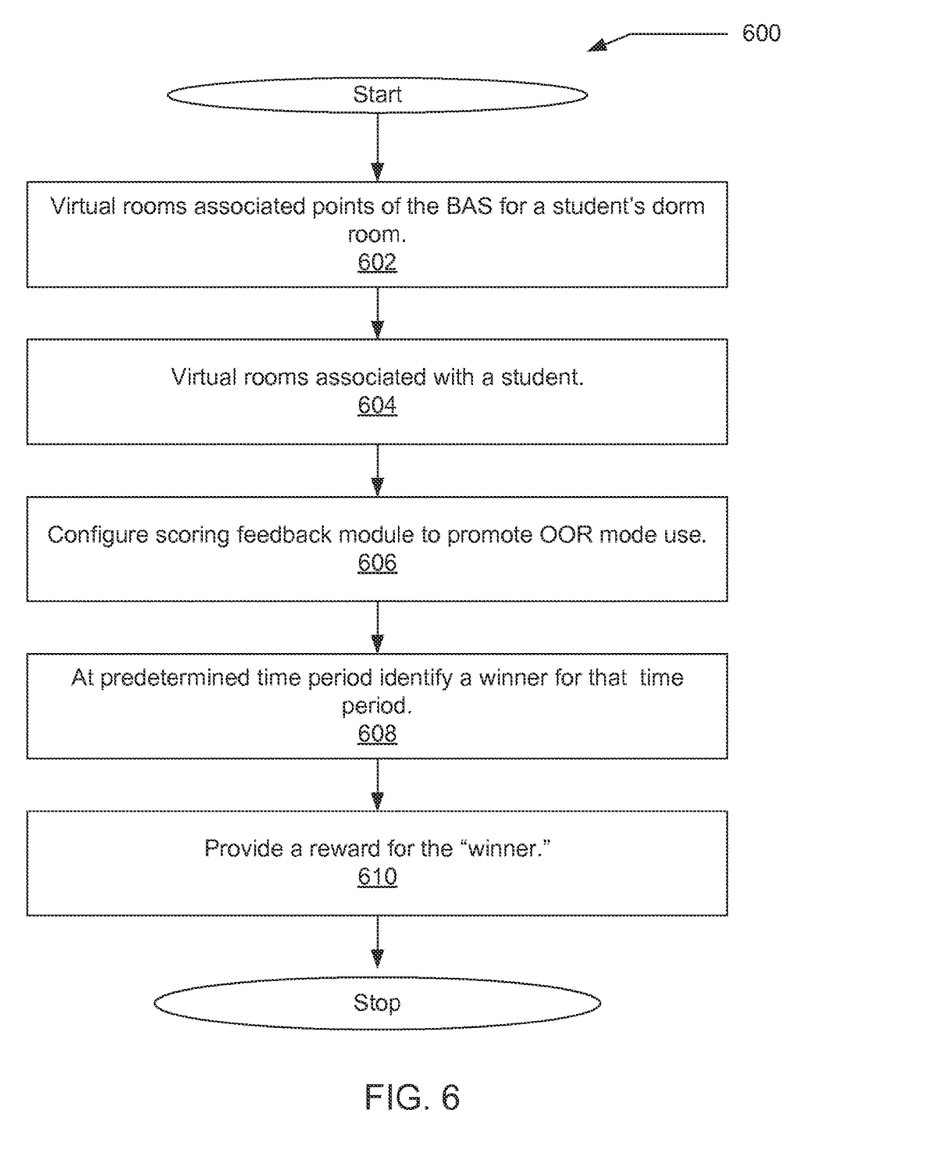
FIG. 6 illustrates a flow diagram of another gaming approach implemented by the scoring feedback module in the BAS server 102 of FIG. 4.

A second approach may be implemented in a BAS 100 with smart meters. All students in a dorm with each student's room being a virtual space (step 602) associated with that student (step 604) may compete against each other for energy savings. At predetermined times, the points associated with the smart meters report energy usage for all the students playing the "game" to the scoring feedback module (step 606). At predetermined times, such as weekly, a winner for the week is determined (step 608) and a reward is provided (step 610). An example of a reward may be reduced utility payments for the month.

In a third example, a group of people who reside in an office environment with cubes may all be assigned to a virtual room. Since no individual may have total control of the environmental parameters, the groups' actions may be used or averaged by the scoring feedback module 402 to determine the score for individual.

As demonstrated, rewards may be geared toward a single winner or loser for green behavior, multiple winners for achieving a threshold of green behavior, or combination of individual and multiple winners. In other implementations, bad or non-green behavior may be provided with a negative reward (punishment). A combination of positive and negative feedback may also be provided.

It will be understood and appreciated that one or more of the processes, sub-processes, and process steps described in connection with FIGS. 5 and 6 may be performed by hardware, software, or a combination of hardware and software on one or more electronic or digitally-controlled devices. The software may reside in an application memory in a suitable electronic processing component or system such as, for example, one or more of the functional systems, devices, components, modules, or sub-modules schematically depicted in FIG. 4. The application memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored there in which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

What is claimed is:

1. An apparatus for modification of behavior when using a building automation system (BAS), comprising:
a change record for the BAS and a user identifier from a plurality of possible user identifiers associated with one or more users reported from a building automation input device that is part of the BAS, where the user identifier is associated with a plurality of set point conditions in the BAS, wherein the building automation input device is in an out of room mode;
a memory that stores the change record for the BAS and the user identifier when a change in set point is received; and
a controller coupled to the memory that executes a plurality of rules on the change record identifying a change in at least one of the plurality of set point conditions in the BAS that identify at least one behavior from a plurality of behaviors and generates an indication of which of the user identifiers from the plurality of user identifiers meets the behavior identified by the BAS,
wherein the change includes a time period of operation of the out of room mode based on a first time when the out of room mode is entered and a second time when the out of room mode is exited.

2. The apparatus of claim 1, where the indication of which of the user identifiers meets the behavior further includes limiting the indication to a virtual room that is associated with the building automation input device that generated the change record.

3. The apparatus of claim 1, where the behavior is a desired behavior.

4. The apparatus of claim 3, wherein a reward for the desired behavior for the user identifier associated with a winner from among the plurality of possible user identifiers associated with the one or more users is triggered by the controller.

5. The apparatus of claim 4, where a penalty for the undesired behavior is triggered by the controller.

6. The apparatus of claim 1, where the behavior is an undesired behavior.

7. The apparatus of claim 1, where the building automation input device is a thermostat.

8. The apparatus of claim 1, where the building automation input device is a smart device communicating over a wireless network with the building automation system.

9. A system for modification of behavior when using a building automation system, comprising:
a building automation input device that is part of the building automation system in communication with a server that reports a change record and a user identifier from a plurality of possible user identifiers associated with one or more users, where the user identifier is associated with a plurality of set point conditions in the BAS and the change record include changes in BAS set points, wherein the building automation input device is in an out of room mode;
a memory that stores the change record and the user identifier when received by the server; and
a controller coupled to the memory that executes a plurality of rules on the change record identifying a change in at least one of the plurality of set point conditions in the BAS that identify a behavior and generates an indication of which of the user identifiers from the plurality of user identifiers meets the behavior, where the rules are set using a graphical user interface,
wherein the change includes a time period of operation of the out of room mode based on a first time when the out of room mode is entered and a second time when the out of room mode is exited.

10. The system of claim 9, where the indication of which of the user identifiers meets the behavior further includes limiting the indication to a virtual room that is associated with the building automation input device.

11. The system of claim 9, where the behavior is a desired behavior.

12. The system of claim 11, wherein a reward for the desired behavior for the user identifier associated with a winner from among the plurality of possible user identifiers associated with the one or more users is triggered by the controller.

13. The system of claim 9, where the behavior is an undesired behavior.

14. The system of claim 13, where a penalty for the undesired behavior is triggered by the controller.

15. The system of claim 9, where the building automation input device is a thermostat.

16. The system of claim 9, where the building automation input device is a smart device communicating over a wireless network with the building automation system.

17. A method for modification of behavior of users of a building automation system, the method includes the steps of:

receiving a change request report from a building automation input device in an out of room mode of the building automation system and a user identifier from a plurality of possible user identifiers associated with one or more users, where the user identifier is associated with a plurality of set point conditions in the BAS;

storing in a memory the change report from the BAS of changes in at least one set point and the user identifier when received;

executing a plurality of rules on the change record identifying a change in at least one of the plurality of set point conditions in the BAS by a controller coupled to the memory that identify an at least one behavior, wherein the change includes a time period of operation of the out of room mode based on a first time when the out of room mode is entered and a second time when the out of room mode is exited; and generating an indication of which of the user identifiers from the plurality of user identifiers meets the behavior.

18. The method of claim 17, where generating the indication of which of the user identifiers meets the behavior further includes limiting the indication to a virtual room that is associated with the building automation input device.

19. The method of claim 17, where the behavior is an undesired behavior.

20. The method of claim 17, where the building automation input device is a thermostat.

21. The method of claim 17, where receiving further includes communicating with the building automation system over a wireless network, where the building automation input device is a smart device with the building automation system.

* * * * *